Nov. 5, 1946.                G. W. WALTON                    2,410,538
                              PRIME MOVER
                          Filed Aug. 8, 1941            5 Sheets-Sheet 1

INVENTOR
*George William Walton*
BY
*Dean Fairbank & Hirsch*
ATTORNEYS

Nov. 5, 1946.  G. W. WALTON  2,410,538
PRIME MOVER
Filed Aug. 8, 1941  5 Sheets-Sheet 2

INVENTOR
George William Walton
BY
ATTORNEYS

Nov. 5, 1946.   G. W. WALTON   2,410,538
PRIME MOVER
Filed Aug. 8, 1941   5 Sheets-Sheet 3

INVENTOR
*George William Walton*
BY
*Dean Fairbank & Hirsch*
ATTORNEYS

Nov. 5, 1946. G. W. WALTON 2,410,538
PRIME MOVER
Filed Aug. 8, 1941 5 Sheets-Sheet 4

INVENTOR
*George William Walton*
BY
*Dean Fairbanks & Hirsch*
ATTORNEYS

Patented Nov. 5, 1946

2,410,538

UNITED STATES PATENT OFFICE 2,410,538

PRIME MOVER

George William Walton, Farnham Common, England

Application August 8, 1941, Serial No. 405,967
In Great Britain November 22, 1939

20 Claims. (Cl. 60—35.6)

This invention relates to prime movers of the gaseous fluid type. More particularly it relates to internal-combustion jet-reaction prime movers of the kind which provide power output in rectilinear form combined with turbine action which provides rotary power which is wholly or principally consumed internally by the prime mover in maintaining proper functioning thereof. The improved prime movers are applicable for direct aerial propulsion and may at very high translational velocities effect such propulsion by employing a rocket action wholly or to a large extent.

Hitherto prime movers have been arranged to produce rotary mechanical power which for the purposes of aircraft propulsion is used to drive an airscrew to obtain an axial thrust so that power production and propulsion are kept distinct. An exception to this is the rocket but this has relatively poor performance at low velocities.

An object of the invention is to provide means for jet propulsion and like purposes which require rectilinear power, the said means dispensing with independent prime movers for supply of ancillary power necessary in the proper functioning of those means, the jet ducts of the means themselves providing ancillary power as one component of the total power developed by jet reaction in those ducts.

The present invention largely, if not wholly, operates with the expansible fluid at velocities above that of sound in the fluid within the device.

Another object of the present invention is to provide a prime mover comprising one or more members each of which is of itself a prime mover and consists of a rigid structure shaped to form a system of helical passages around a common axis, through which flows continuously a gaseous fluid which is compressed, heated at pressure by the combustion of a fuel and expanded thereby converting heat into kinetic energy of that fluid, the peripheral component of that energy being transferred to the said structure by the walls of the helical passages causing it to rotate on its axis, and the axial component of the said kinetic energy provides a rectilinear power output.

Another object is to provide in a prime mover comprising two or more such members means which retain the said members and prevent any one of them moving in the direction of its axis relative to the other said members.

The said rectilinear power output or the resultant power output of the several such outputs where the prime mover comprises two or more of the said members is usefully applied in one of three methods depending on the particular work to be performed, the first method being when the prime mover is completely unrestrained and the power developed propels the prime mover itself in a gaseous fluid; the second method has the prime mover partially restrained by attaching a load to it which is to be propelled in a gaseous fluid and in certain cases additional means associated with the prime mover are required whereby the maximum power can be usefully developed in propelling, supporting and controlling the course of that load; and the third method has the prime mover completely restrained from motion in an axial direction or in a resultant direction of the several axial directions where the prime mover comprises two or more of the aforesaid members and additional means are required for the purpose of developing maximum power in an appropriate medium to perform useful work in every such application examples of which are, maintaining a vacuum in a vacuum system, compressing a gaseous fluid in a compressed gas system, driving a turbine rotor to develop rotary power, fluid pumps in which the aforesaid axial kinetic energy of the gaseous fluid from the said member or members is transferred to some other fluid in the manner of known jet pumps and marine propulsion in the same manner by transfer of the kinetic energy of gaseous fluid to water.

Other objects of the invention are the incorporation in such primer movers of electric motors and/or generators, fuel metering and control devices and ignition devices which are necessary for the satisfactory functioning of such prime movers.

Embodiments of the invention will now be described by way of example with reference to the accompanying drawings in which corresponding parts in several figures are denoted by the same reference numerals. In the drawings.

Figure 1:
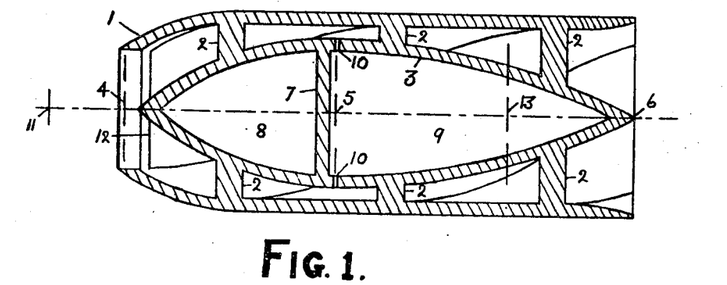
Fig. 1 shows a simple embodiment of the invention in section.

In Fig. 1 an open ended cylinder 1 is rigidly attached by a number of helical vanes 2 at substantially equal angular separations to a hollow streamlined core 3 which is within and coaxial with 1. In operation the device spins rapidly on its axis 4—6, drawing in expansible fluid at 4, compressing the fluid to a maximum at 5 and allowing the fluid thereafter to expand towards and discharge at 6. A partition 7 divides the hollow core 3 into two compartments 8 and 9 and the latter communicates with the passages formed between 1 and 3 and adjacent vanes 2 through orifices 10 one or more to each passage.

The device of Fig. 1 is in itself a complete prime mover which operates immersed and using the developed power for propelling itself in the expansible fluid. As such it may be used as an aerial torpedo in which case the expansible fluid is air, the compartment 9 contains liquid, compressed gas or pulverised solid fuel and compartment 8 may contain a disposable load, for instance an explosive charge and a detonator. The starting of the torpedo requires rotation of the device and an axial flow of air through it. Once started the air enters the passages between 1 and 3 at 4, is accelerated by the vanes 2 and compressed by the constriction of the passages to a maximum pressure at 5; fuel from 9 is forced by centrifugal force through the orifices 10 into the passages and there ignited by the temperature of the air or other means of ignition and burns throughout a zone extending towards 6, thereby heating the air which expands in the divergent passages, so tending to acquire additional kinetic energy some of which is transferred by the vanes 2 to maintain the spin of the device; the products of combustion are discharged into the atmosphere at 6. An axial thrust is developed in the direction 6 to 4 due to accelerating air and fuel in the direction 4 to 6 and so propels the device.

The characteristic features in the operation of the device of Fig. 1 are generally the same as for all types according to the invention so that a discussion of them will serve for all. From 4 to 6 in Fig. 1 air has a relatively high velocity at all points and because of this specific compression and combustion chambers are not required. The study of changes of energy, heat, pressure, density, temperature, velocity and the like in such an air flow requires knowledge of thermo- dynamics and aerodynamics. Unfortunately thermodynamics largely ignores motion and the kinetic energy of expansible fluids, and aerodynamics largely ignores heat effects and expansion, consequently their conventional formulae and ways of understanding processes are clumsy when applied to the air flow in Fig. 1. A principal feature of that flow is that its kinetic energy is the link between heat and mechanical energy and another feature is that velocity of the flow is employed instead of pressure so that in effect large differences of pressure at different points in the direction of flow are possible without valves, pressure chambers, and the like.

Figure 2:
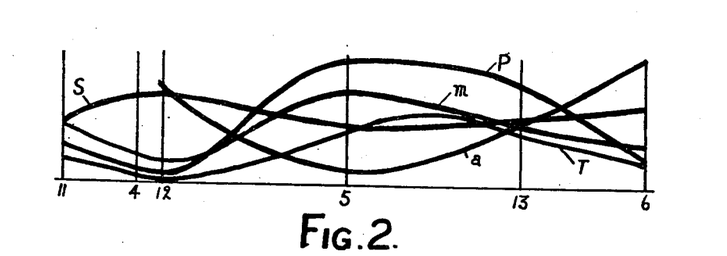
Fig. 2 shows general characteristics of the device of Fig. 1 in approximate graphs.

The kind of changes of energies of the gaseous fluid along the passages of devices according to the invention, heat given to that fluid, and transfers of mechanical energies between the fluid and the structure of a device, will be better comprehended with the assistance of the approximate developed graphs shown in Fig. 2, which are drawn with particular reference to the device of Fig. 1. In Fig. 2, abscissae correspond to axial distances in Fig. 1, the points 11, 4, 12, 5, 13 and 6 corresponding to similarly numbered points along the axis of Fig. 1, the ordinates of the curves in Fig. 2 corresponding to the values of the pressure P, absolute temperature T, the density $m$ and the velocity S of the gaseous fluid, while the ordinates of the curve $a$ show the corresponding cross-sectional total areas of passages for unit flow from which the shape of the passages can be obtained.

Suppose the device of Fig. 1 to be spinning but restrained from axial motion through the atmosphere, air will be drawn in at 4 and will be accelerated by the vanes 2 towards 6 and as there is no control of the rate of spin and the amount of fuel burnt increases with spin the latter would increase indefinitely but for the fact that the air entering at 4 is limited to a very definite maximum. At that limit the air pressure at 4 has the velocity of sound in the air. This is only true with no velocity at 11; if there is, pressure at 4 is greater so that when at 11 air has the velocity of sound in the direction 4 to 6 conditions at 4 are the same. The air can rise to a greater velocity than that of sound if the passages after 4 diverge, for instance by rounding the nose of 1 in Fig. 1.

The expansion of air into 4 and thereafter takes place with substantially no loss for it is adiabatic, i. e. the polytropic exponent $p=z$, but work must be performed by the vanes 2 to maintain the low pressure. If the air expands between 4 and 12, the plane of the leading edges of vanes 2, there is a corresponding thrust developed in the direction 6 to 4 and is exerted against the inside surface of the curved nose of 1.

The spin of the device of Fig. 1 is unconstrained so that for a given applied torque it will increase until torque is balanced by the resistance thereto. The result of this is that the vanes 2 at 12 have a positive or zero angle of attack to the air stream at 12, if the former air velocity after 12 is increased. To ensure equal angle of attack along the whole leading edge of a vane it must be scroll formed, i. e. combined helical and spiral, between 12 and 5 so that in any plane normal to the axis a point in a vane at a greater radius than some other point will be in angular advance thereto.

The device of Fig. 1 is of a form intended for high axial velocities at which at least sound velocity of air would be present throughout the device. In such a case the resultant velocity of air through the passages would have a component normal to the vanes and one along the passages. The former of these is constant for a constant pitch of vanes. The component along the passage can vary and friction, increase of pressure and reduction of the area of passage will reduce it. The contraction of the passages between 12 and 5 results in a decrease of supersonic air velocity along them which means a reduction of kinetic energy. This energy cannot be destroyed or transferred to the spin of the device so it is converted into additional heat energy of the air increasing the temperature and pressure. At the final axial velocities of Fig. 1 and with a usual degree of compression at 5 there would still be supersonic air velocity at that point. The form of the core 3 between 12 and 5 is decided by the way in which the air is compressed, i. e. it is largely dependent on the value of the polytropic exponent $p$ in the general relation given above, if $p=z$ then compression is adiabatic. The air heated by combustion of the fuel injected into the passages expands even before combustion is completed at an axial distance shown by the point 13. The mass of the air plus that of fuel consumed is accelerated by expansion along the passages and because the latter are inclined to the axis of the device there is a tangential and an axial component of kinetic energy the former being against the spin of the device. Similarly the kinetic energy of air and fuel at 5 has axial and tangential components the latter being with the spin. The two tangential components of kinetic energy are always equal and opposite so that the discharge of air and products of combustion at 6 is in an axial direction at a velocity equal to or greater than the axial velocity of the device. Any transfer of kinetic energy to or from the air and fuel before 5 from or to the vanes is accompanied by an opposite transfer after 5 so that a balance is maintained.

In Figs. 1 and 2, air at atmospheric pressure and temperature at 11 expands adiabatically to 12 if there is reduced pressure at 12, otherwise the value of P at the two points are equal. From 12 to 5 air at supersonic velocity is adiabatically compressed, heated by combustion while expanding from 5 to 13 and then expands adiabatically between 13 and 6 to be discharged at 6 at atmospheric pressure. By choosing a suitable rate of divergence for the passages from 5 to 13 in Fig. 1 together with a form or number of suitably distributed fuel jets 10 in that part of each passage and delivering fuel if liquid or solid in appropriate sizes of particles pressure can be substantially constant from 5 to 13 though towards the end of the combustion zone the heat supplied falls off.

The upper part of Fig. 2 shows graphs of the corresponding energies of the gases in the flow along the axis of the device of Fig. 1 ordinates being energy values, namely, total $e$, kinetic $k$, heat $hT$ of the gases, $q$ heat energy added and $-w$ and $+w$ mechanical energy output and input respectively. The frictional loss of energy and the heat loss are not shown but together with $w$ and $q$ result in variation of $p$ the polytropic exponent.

The thrust developed by the device of Fig. 1 consists of two parts, that due to accelerating the fuel consumed and that due to accelerating the air flowing through the device. At the greatest axial velocity of the device the former supplies all the thrust, for all the externally available energy is used to accelerate the fuel whilst at zero velocity of the device this thrust is at a minimum. The device because of this is capable of a very high velocity. At the terminal velocity air enters and leaves the device at substantially equal velocities. Terminal velocity is attained when at lower velocities thrust is greater than drag.

Figure 17:
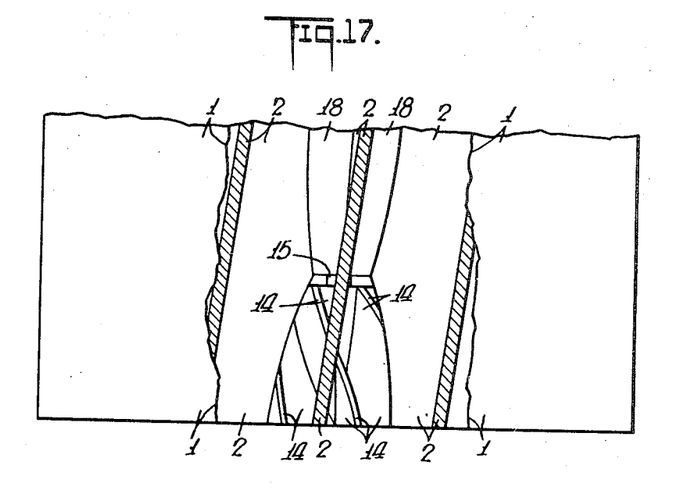
Fig. 17 illustrates a detail of the device shown in Fig. 3.

In some cases auxiliary power may be required in a device as shown in Fig. 1 and as it consists of a single member only air pressure can be used either from the passages near 5 or from a forward facing orifice when there is axial motion. Where such air pressure cannot be used directly but requires additional mechanism it is more simple to provide a member rotating relative to the body of the device and driven by the flow of air through it. Such an arrangement is shown in section in Fig. 3 and consists of the additional bladed rotor 14, mounted on a spindle 15 running in bearings 16 and 17, and a tail portion of the core 18 the ends of which house the bearings. The pitch of the blades of 14 may be such as give it the desired speed and direction of rotation relative to cylinder 1, for instance, as 14 is of small radius for the same centrifugal stress as in the cylinder 1 it can run faster than 1, say double the speed, so that 14 rotating in an opposite direction relative to 1 has three times the speed of revolution, and Fig. 17 shows the rear portion of the device of Fig. 3 with part of cylinder 1 removed, exposing the vanes 2 and the blades of rotor 14 and also showing the relative pitches of said blades. As shown 14 drives an electric generator consisting of a permanent magnet rotor on the spindle 15 and a wound stator fixed in 18, providing electric current through leads 83 for the heater 84 of the ignition element 75; and because of the high speed of 14 a considerable output is obtained with quite a small simple generator stator.

Figure 3:
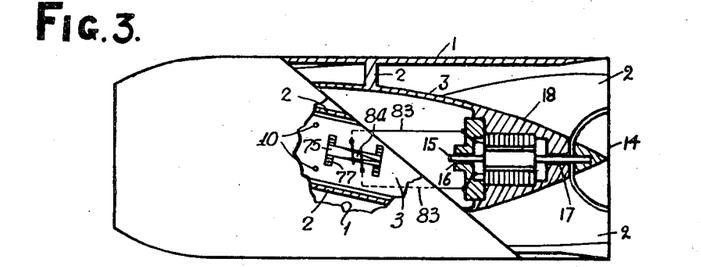
Fig. 3 shows in section a modification of Fig. 1 having two rotors.
Figure 4:
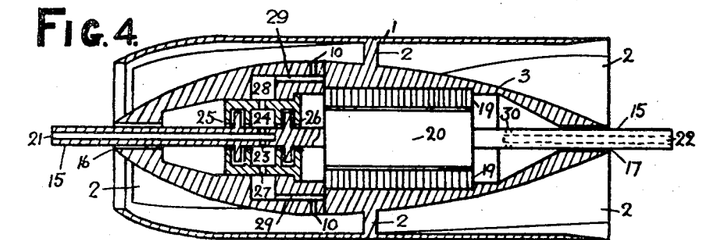
Fig. 4 shows in section an embodiment of the invention having a single rotor running in bearings and incorporating an electric motor for starting.

The propulsive effort of a device as in Fig. 1 or 3 can be used for propelling aircraft, vehicles or boats, or the device can be used to maintain a vacuum or to give a jet of high velocity air for such purposes as air compression by directing the jet into a compression chamber, so converting kinetic energy into pressure, or driving impulse and/or reaction turbine rotors so forming an internal combustion turbine with self compressing burner expanding nozzles. For any such purpose it is necessary to restrain axial motion of the device so that a spindle and bearings are required. Where the rotary power of the device is to be employed the spindle is rigidly fixed to it, in other cases the device may run on a fixed spindle, an example of which is shown in Fig. 4. In Fig. 4 bearings 16 and 17 are housed in the nose and tail respectively of the core 3 and permit rotation on the fixed spindle 15 passing through the core 3. The device is provided with an electric motor of which the rotor 19 is fixed inside the core 3 and the wound stator 20 is fixed on 15. This motor may be of alternating current induction type so that brushes are not required and it can also serve as a generator if excited by a leading current at frequencies lower than those corresponding to rotational speeds. The spindle 15 has a bore 21 for connection to jets 10, 21 being open through one or more holes 23 to an annular chamber 24 with labyrinth packings 25 and 26 to prevent fuel leakage along the spindle. The chamber 24 and the rotor parts of 25 and 26 which are integral therewith are diametrically split for assembly and are fixed in the core 3 with holes 27 communicating with the annular groove 28 which has ducts 29 to the fuel jets 10. One or more holes 30 in 15 allow motor leads from the windings to be passed through 22 for external connection. The device of Fig. 4 in use has the ends of the spindle 15 clamped in brackets, bridge members or forks which for aircraft propulsion are fixed to the airframe with suitable fuel and electrical conections.

Figure 5:
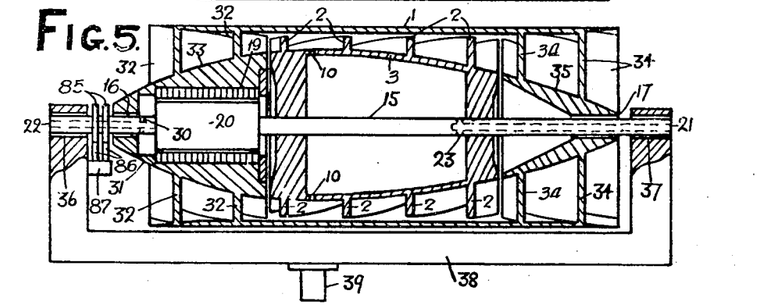
Fig. 5 shows in section a modification of Fig. 4 with two rotors.

The additional rotor in Fig. 3 may be used to drive a vaned member at the nose of the device by extending the spindle 15 so that the air may be more compressed and/or for a given pressure the velocity of air at 5 in the passages increased. A similar arrangement is shown in Fig. 5 in section the device in effect being divided into a nose portion 31 with vanes 32 and core 33 rigidly fixed to a tail portion having vanes 34 and core 35 by the hollow cylinder 1 and a central main portion with vanes 2 and core 3 on a spindle 15 running in bearings 16 and 17 housed in the nose and tail portions respectively and also running in bearings 36 and 37 in a fork 38 which has a trunnion 39 turning in suitable bearings housed in some other structure, for instance an airframe, so permitting the whole device to be swung about a transverse axis. The nose and tail portions together form one rotor and the central portion a second rotor each capable of independent rotation and when the pitch of vanes is opposite in the two rotors they rotate in opposite directions. As in Fig. 4 an electric motor is provided with the wound rotor 20 fixed to 15 and an unwound rotor 19, e. g. squirrel cage, fixed in the core 33; slip rings 85 fixed on 15 serve to carry current from brushes 86 in the insulating block 87 fixed to 38 to the windings of 20. The spindle is bored as in Fig. 4 for electric leads and fuel supply, reference numbers being the same. In operation gases heated by combustion commencing near the orifices 10 partly expand and drive vanes 2, are discharged into vanes 34 and combustion may extend therein where final expansion takes place driving vanes 34 and therefore vanes 32 which accelerate intake air, partly compress it and discharge into vanes 2 at high velocity because of the opposite rotation of 32 and 2, full compression being obtained at the zone into which fuel is injected by jets 10.

The device of Fig. 5 operates substantially as that of Fig. 1 with the advantage that at low axial velocities high compression and/or high velocity at highest pressure can be obtained so that it is more suitable for aircraft propulsion and the like. The idea of Fig. 5 may be extended and more than three sections used. In all such types in the central portion, where fuel is injected and ignition commenced, leakage of air backwards may be largely prevented by having pressure at the forward end equal to that at the rear end, e. g. practically the whole central portion should be in the constant pressure zone.

Figure 6:
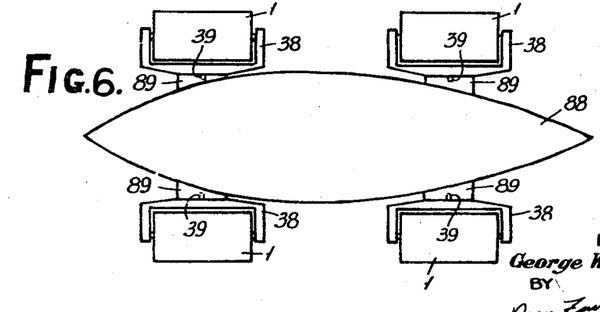
Fig. 6 shows in plan view an arrangement of four prime movers according to the invention mounted in forks adjustable about transverse axes and attached to a fuselage.

Fig. 8 shows a plan arrangement of four prime movers according to the invention, for example of the kind shown in Fig. 4 or 5, mounted in forks as in Fig. 5 attached to a fuselage so constituting a complete aeroplane, for, because the axes of the prime movers can be swung about transverse axes, they serve as means for support, propulsion and control. In level flight the noses of the devices are tilted upwards, part of the thrust supporting the weight of the aeroplane and the remainder propelling it. Hovering is possible and yaw, pitch and bank control can be obtained by differential adjustment of the tilts of the axes of the prime movers. Such an aeroplane presents a number of advantages including silence, speeds above that of sound, stratosphere flight, safety, cheapness, low or zero takeoff and landing speeds, ability to takeoff and land in restricted area, land or water, and long life with little attention.

The safety is due to the fact that up to three power units can be out of action provided that those in action are capable of supporting the weight of the aeroplane with or without jettison of load or failing that give sufficient lift to slow down the rate of descent so that there cannot be a bad crash. One unit out of action means that the adjacent units have more tilt and speed is reduced; one forward and a rear opposite out of action means more tilt and lower speed; one pair forward in action only means travelling tail down with loss of speed and pitch control only; rear pair in action only is the same but with nose down; port or starboard pair in action means turning over onto starboard or port beam respectively and so travelling nose up without bank control at lower speed; only one unit in action means turning onto opposite beam travelling, nose up for a forward unit and nose down for a rear unit, with bank and pitch control out of action but retaining yaw control because of air pressure on the fuselage and controlling altitude by power variation. Even where the weight cannot be supported at high altitude, descent to lower altitude where the air is more dense means an increase of power developed and therefore greater lift so that rate of descent progressively decreases. Units out of action may be repaired in flight and this can be facilitated by having the trunnion 39 Fig. 6 in a bearing which permits the unit to be swung inboard through a door in the fuselage where it can be inspected, repaired or replaced by a spare unit or one of the others as required.

Instead of four prime movers as in Fig. 6 it will be obvious that any number may be used with or without swinging axes.

In military aircraft prime movers according to the invention are not so vulnerable as those now used for the peripheral velocity of the cylinder 1, Figs. 1, 3, 4 or 5, may be greater than 1000 feet per second which is comparable to the velocity of gun missiles and nearly a half that of rifle bullets so that there is a great probability that such missiles will be deflected without penetrating except those directed in a substantially axial direction striking near the axis of the device which may pass through the core without in any way affecting the device. As there are a number of passages each of which develops power independent of the others several may be put out of action without stopping the device, vanes may be perforated by bullets and only cause a reduction of power, and core and outer cylinder may be perforated in many places without all of the passages going out of action.

Prime movers according to the invention have at constant density of air and of fuel inherent fuel control. This is due to the relation of the spouting velocity of the fuel jets to the axial velocity of air through the device; when the fuel has behind it the same air pressure as it discharges into, and with constant temperature of fuel and constant density of air, the fuel supply varies directly as the axial velocity of the air so maintaining correct ratio of fuel to air.

In aerial propulsion the density of the air changes considerably with altitude so that additional control is required for changes in the ratio of air to fuel mass densities. The total mass of air per second M in the air flow is given by the relation $M=Asm$, where A is the cross-sectional area of passage at any point, S the velocity and $m$ the mass density at that point. The same relation applies to fuel flow. The area A is constant for air, and fuel and air velocities have a constant relation so that area of the fuel jet or the equivalent can be made to vary with the ratio of mass densities to obtain full automatic control of air-fuel ratio under all atmospheric conditions. Mass density of air is given by $m=P/(GT)$, where G is the gas constant in terms mechanical energy units per unit mass, i. e. $G=gR$ where R is the conventional gas constant and $g$ is the gravitational constant. If the fuel is a gas the same relation holds and if a liquid its density changes inversely with temperature according to some function so that if densities are taken at the same temperature the ratio of densities varies as some function of air pressure.

Aerial torpedoes as in Figs. 1 and 3 present the most simple problem of fuel control in that maximum power is required at all times, therefore all air passages are in action, power is limited only by the quantity of air passing through the device and torque and thrust tend to balance the resistances thereto. Fuel control is reduced to that described in the last paragraph and a form of mechanism for the purpose is shown in section in Fig. 7.

Figure 7:
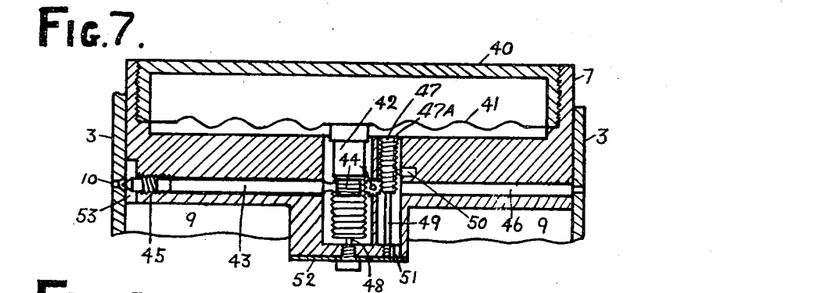
Figs. 7 and 8 show devices for the control of fuel in prime movers according to the invention.

Fig. 7 represents the partition 7 in Fig. 1 and consists of a disc like portion 7 into which is screwed an evacuated capsule having a rigid cup 40 and a flexible corrugated diaphragm 41. Attached to the centre of 41 is a threaded cylinder 42, which serves as a rack with axial motion thereof, engaging with a toothed portion 44 of a needle valve rod 43 which has a threaded portion 45 screwed into 7. Pressure on the outside of 41 causes it to move inwards so giving 42 axial motion which rotates 43 and gives it an axial motion because of the thread at 45 which increases the opening of the orifice 10 in the core 3 of Fig. 1. Air pressure from outside the core 3 is applied to 41 through ducts 46. Though not shown in Fig. 7 there are for each air passage in Fig. 1 one duct 46 and one valve rod 43 in the device of Fig. 7. All ducts 46 communicate with the space outside 41 and all rods 43 engage with 42 and are threaded into 7. It must be observed that centrifugal forces cannot disturb accurate fuel control since such forces cannot effect the settings of parts 42 and 43 owing to their disposition in the device, and in order that axial acceleration shall have no disturbing effects the mass of 41 and 42 is balanced by threaded cylindrical plungers 47 each of which engages with the toothed portion 44 of the rod 43 so that 47 moves with 42 but in the opposite direction; therefore axial acceleration has no effect on the mechanism. To reduce friction 42 slides on a pin 48 fixed in 7 and is prevented from turning by 41. Similarly plungers 47 slide on pins 49 and are prevented from turning by pins 50 and longitudinal grooves in 47 shown in dotted lines at 47A. Pressure on 41 and in the fuel chamber 9 must be equal for correct control, so communicating vents 51 are provided covered by a flexible disc valve 52 so that when pressure in 9 is the greater, unlikely in normal operation, the vents 51 are closed. When the device of Fig. 1 is in operation fuel in 9 because of centrifugal force collects on the inner surface of the core 3 and except when 9 is full leaves a cylindrical core about the axis of air and/or vapour; it is the pressure of that core which is equalised with pressure on 41 through vents 51. The fuel in 9 has greatest pressure at the largest diameter of the chamber which is at the orifices 10 and there is always fuel there so long as some remains in 9. Recesses 53 are provided in 7 around each rod 43 which open into the chamber 9 so ensuring adequate fuel supply to each orifice 10.

The fuel control arrangement of Fig. 7 secures equal air pressure outside 10 and inside 9 through 46 and 51; fuel supply through 10 varying with pressure outside 3 through 46, movement of 41 and 42, rotation of 43 and axial motion thereof. Fuel temperature at 10 is substantially that of air outside 3 at 10 so that all that remains is that the ends of the rods 43 at 10 shall be of such a contour that fuel flow through 10 shall be in accordance with the ratio of air and fuel densities at any pressure of air likely to be encountered.

Fuel control in prime movers according to the invention used in aircraft propulsion presents something more than the problem of efficient combustion. At sea level a large percentage of the developed power is expended in supporting the machine and the percentage increases with altitude so that something approaching constant power is required even with changes of air density. This cannot be obtained from combustion in a fixed number of passages of fixed size, therefore passages inactive at high air density must be brought into action at low densities, i. e. passages must be switched into or out of action. In addition efficient combustion at all air densities is necessary so that a fuel control as in Fig. 7 is also required.

Heat engines ordinarily have a fixed volumetric capacity so that power must decrease with density of expansible fluid. This can be overcome as in present aircraft engines by supercharging, i. e. maintaining air density by an additional compressor, a method equally applicable with the present invention but one which leads to unjustified complication in view of simplicity, high power-weight ratio and the fact that volumetric capacity not used in power production is still of importance in propulsion.

The design of a prime mover according to the invention for aircraft propulsion commences with the maximum altitude at which it is to operate and the maximum speed required at that altitude. This fixes volumetric capacity and power required for a thrust to support the weight of the aeroplane and to overcome its resistance in translational motion. At sea level a minimum of this capacity will be employed to produce the same power. The volume of air flow $V=AS=M/m$ so that change of total passage area can compensate for changes of air density and may be accomplished by supplying fuel to a requisite number of equal passages or to a proper combination of unequal passages. For instance there may be three areas of passage in the ratio of 1, 2 and 4 so that seven different active areas can be obtained by combination. In order that balanced torque shall be obtained it is advisable that there be two or more similar groups of passages, equal areas of passages being simultaneously active and at equal angular separation around the axis. Figs. 8 to 12 show a fuel control mechanism for such an arrangement of unequal passages.

Figure 8:
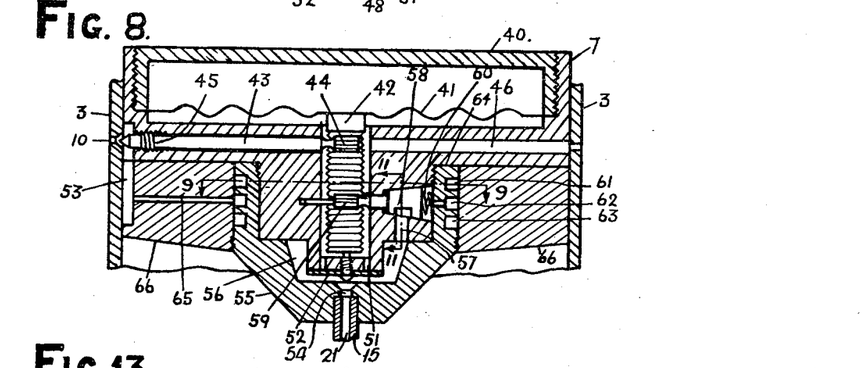
Figure 9:
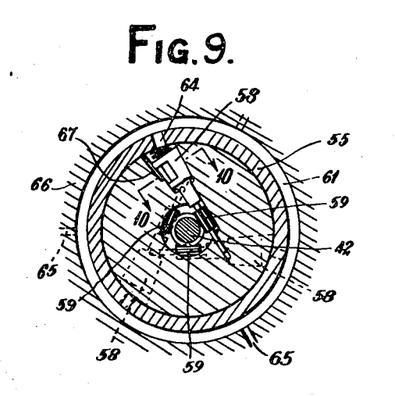
Fig. 9 is a section of a detail, taken on the line 9—9 in Fig. 8.
Figure 10:
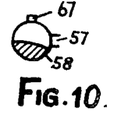
Fig. 10 is a diagrammatic section of a valve, as seen on the line 10—10 in Fig. 9.
Figure 11:
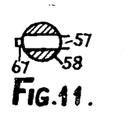
Fig. 11 is a similar section of another valve, as seen on the line 11—11 in Fig. 8.
Figure 12:
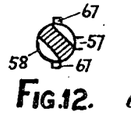
Fig. 12 is a similar section of a third valve appearing in dotted lines in Fig. 9.

In Fig. 8 fuel enters at 54 from an external source, for example, through the bore 21 of spindle 15 as in Fig. 5, 15 fitting in a bore in the part 55 to be fueltight. On entering at 54 fuel collects by centrifugal force on the inside conical surface of the chamber 56 in 55, the only outlets being through valves to groups of fuel orifices 10 so that fuel is cut off from groups when the valves are closed. Fuel is controlled at each of the orifices 10 by the same means as in Fig. 7. The group fuel control valves 58 for three groups of combination passages are at 120 deg. separation in the boss of the part 7 (Fig. 9) and each consists of a truncated cone valve head 58 rotated by a toothed portion 59 which engages with the threaded cylinder 42 which moves axially with changes of air pressure on 41 and 59 has one complete revolution for the full movement of 42. Fuel enters a valve through holes 57, and the head 58 has cut-away portions permitting communication between 57 and a space above 58 through longitudinal or slightly helical slots 67 (shown in Figs. 10 to 12) in the valve seating. A spring 60 keeps 58 firmly in its seating against centrifugal force and fuel pressure. The part 55 fits around the boss of 7 and the valve springs 60 are retained by it. Annular grooves 61, 62 and 63 one for each group of passages, in 55 are supplied with fuel from the space above corresponding valves 58 through ducts 64 and each supplies fuel through ducts 65 to a group of the recesses 53 about orifices 10 where the needle valve rods 43 control the amount of fuel delivered to the air passages. The part 66, closing 61, 62 and 63, contains ducts 65 and forms isolated cavities of the recesses 53. The axial views of the three valve heads 58 of Figs. 8 and 9 are shown in Figs. 10, 11 and 12 in section at the cutaway portions thereof, the valves controlling fuel supply to groups of passages having the largest, medium and smallest total area of passages respectively and in each the way in which the head 58 is cut away and the number and disposition of the slots 67 are shown which are appropriate for the duty of the valve. The relative positions of the valves in Figs. 10 to 12 are those when air density is low.

Hereinbefore it was stated that at high air density passages not supplied with fuel are nevertheless useful in propulsion. An explanation of this is required and can best be understood from a description of the use of the invention in aerial propulsion at low velocities. Of course inactive passages may have fuel supplied to them so that a considerable reserve of power is available at high air densities for takeoff, landing and in emergency when other power units fail.

The power exerted in propelling the device is thrust times velocity, i. e. $M(S_6-S_{11}) \times S_{11}$, and the power absorbed is $$M(k_6-k_{11}) = M(S_6-S_{11})(S_6+S_{11})$$

divided by 2 so that the efficiency is $$2S_{11}/(S_6+S_{11})$$

neglecting thrust developed and power absorbed in accelerating the mass of the fuel consumed per second. From this it is apparent that for a given developed power instead of having $S_6$ greater than $S_{11}$ it is better to increase M and at high air density this is in effect accomplished by the passages not supplied with fuel as a greater mass of air is accelerated with power therefor supplied by the passages which are supplied with fuel.

In the design of devices for low velocities it is possible to arrange for still further increase the mass of air accelerated and the efficiency of propulsion by choosing a large intake area such that the diameter of the device is about the same as that of an airscrew for equal thrust and intake and discharge velocities are little above that of the outside air so that the device is a self driven airscrew, but some advantages would be lost. Prime movers as in Figs. 1, 3, 4, 5 and 6 are most efficient at high velocities and from many points of view it is better that the bulk of the device should be limited to that minimum decided by the required velocity at the maximum altitude required and the required power under those conditions.

Figure 13:
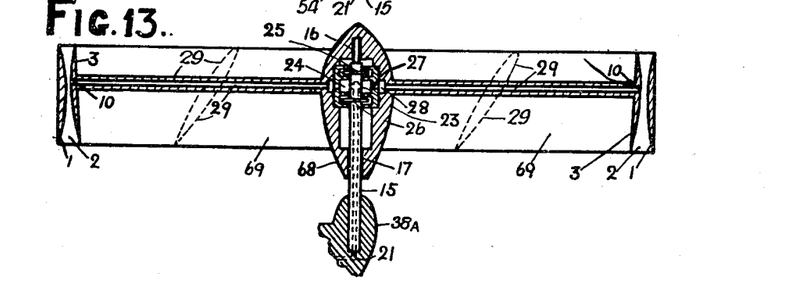
Figs. 13 and 14 show arrangements for aerial propulsion.
Figure 14:
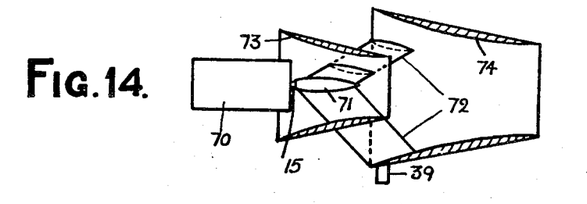

To improve propulsion efficiency at low axial velocities either the diameter of the device must be increased or the velocity of the discharged gases used to accelerate an additional mass of air. Figs. 13 and 14 show in section these alternative arrangements.

Figure 18:
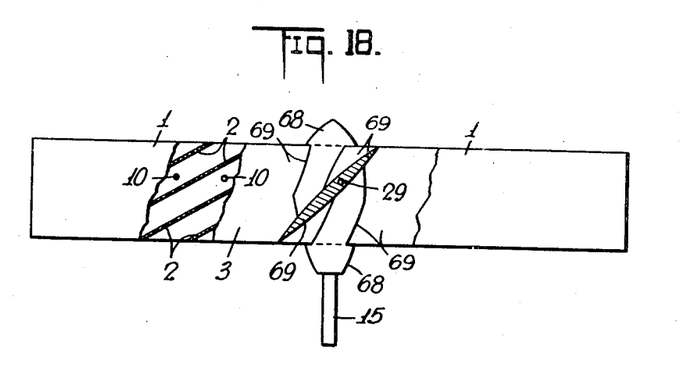
Fig. 18 illustrates a detail of the device shown in Fig. 13.

In Fig. 13, 1, 2, 3 and 10 are parts as in Fig. 1 forming a prime mover according to the invention. The core 3 is open at the ends and is rigidly connected to a second hollow core 68 by a number of vanes or blades 69 having a helical pitch as shown more clearly in the view of the Fig. 13 device shown in Fig. 18 in which a portion of the rim comprising parts 1, 2 and 3 is removed to expose one of the blades which decreases with increase of radius much the same as the blades of an airscrew. The whole device rotates on the spindle 15 in the bearings 16 and 17, the spindle being fixed by an anchorage 38A to some member not shown, for instance an airframe, and having a bore 21 and radial holes 23 for the supply of fuel to annular chamber 24, through holes 27 to annular chamber 28 and from there through ducts 29 to the orifices 10. Labyrinth packings 25 and 26 prevent fuel leakage along 15 from 24, and 29 may be drilled in the vanes 69. Air flows between 3 and 68 with little, if any, change of pressure so that vanes 69 form an airscrew, and because vanes 2 provide the driving torque instead of the hub or core 68, vanes 69 do not require thickening near 68. The vanes 2 have a pitch and variation thereof between points corresponding to 4 and 6 in Fig. 1, which is independent of the pitch of 69, and the number of 2 may be different to that of 69 so that there may be vacuum at the intake of the passages between 1 and 3 and other conditions suitable for producing direct thrust and torque for driving the device which are quite different to conditions between 3 and 68 where thrust and good propulsion efficiency are the chief consideration. The whole device can be likened to an airscrew self driven by a rim of rockets in which the high propulsion efficiency of the airscrew at low axial speeds is combined with the high propulsion efficiency of the rocket at high peripheral speeds. Also the two inefficient zones of an airscrew, one due to blade root thickening, the other to supersonic blade tip velocities, are put to efficient use. For substantially the same swept volume the power unit is included with airscrew and the weight is comparable with that of an airscrew of equal thrust. There is no need for the complexity, weight and expense of variable pitch mechanism as the speed of revolution changes automatically so that the developed power is absorbed in propulsion. For mounting in an airframe only a clamp for the spindle 15 is required and fuel and control connections.

The form of device in Fig. 13 may be modified to include other features herein described as well as such features as are obvious to any skilled in the art, e. g. coaxial groups of passages, coaxial rotors, combinations of nested and axially separate members and the like.

Figure 16:
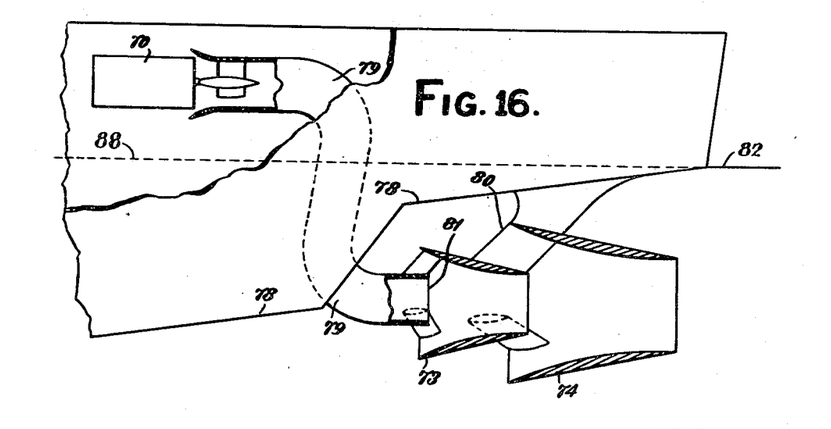
Fig. 16 shows an arrangement for ship propulsion.

Fig. 16 shows another arrangement for obtaining improved efficiency at low axial velocities by using the kinetic energy of the gases discharged by a prime mover 70 of the form shown in Fig. 5 without the fork 38, the rear extension of the spindle 15 of which runs in bearings housed in a streamlined part 71 to which three arms 72 are rigidly fixed. One arm 72 has a trunnion 39 as in Fig. 5 and for the same purpose. Attached to or integral with the arms 72 are any number of tubular members of successively larger diameters 73, 74 and the like each of which contracts in a manner depending on the flow of air and the discharge from 70 therein. The arms 72 are in axial planes and of streamline section to present minimum resistance to airflow. The discharge from 70 is at the same pressure as that on the outside thereof, at lower density, higher temperature and higher velocity, conditions favourable to molecular diffusion between the discharge and air entering the forward end of 73 so that the latter is accelerated by the former, heated, and therefore density reduced, so that with proper design of 73 all gases at the point of discharge from it have substantially uniform density, temperature and axial velocity in a transverse plane. The kinetic energy of the discharge from 70 at discharge from 73 is shared with extra air taken in by 73. This reduction in the velocity of the discharge from 70 means a rate of change of momentum which is negative thrust, i. e., drag, exerted on 73 but the rate of change of momentum in accelerating the extra air flowing into 73 is greater so that the difference of these two rates is a positive thrust which is obtained without further combustion of fuel by using some of the kinetic energy of the discharge from 70 which otherwise would be lost and therefore represents an increase of propulsion efficiency over that of 70 alone. The number of tubes such as 73 and 74 depends on the additional mass of air to be accelerated and each tube has to be of such a diameter and change thereof along the axis that additional air flowing through it is properly accelerated. The arrangement of Fig. 14 is similar to the well known steam jet exhausters and compressors and to the ejector exhausts now used in aircraft with the distinction that the nozzle 70 is self operative, internal combustion, of itself gives a large thrust and gives a jet velocity higher than can usually be obtained with a simple nozzle at usual pressures.

The advantages of Fig. 14 over Fig. 13 are that the prime mover may be of the smallest bulk for the service it is designed for, additional parts may be light as they have not to withstand centrifugal stress or high pressure and temperature and the arrangement is operative at all axial velocities up to terminal.

Ignition of the combustible mixture in the passages of prime movers according to the invention can be accomplished by any of the known means and methods, depending on conditions in the combustion zones, the particular design of prime mover, and mode and range of operation.

Figure 15:
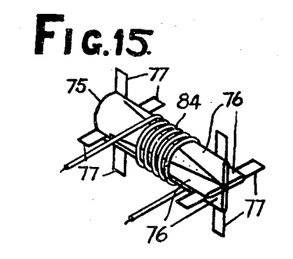
Fig. 15 shows a form of device for obtaining compression ignition in prime movers according to the invention.

The most satisfactory forms of ignition employ a heated solid element fixed, one or more, in each passage at the commencement of the combustion zone at such separation from the walls of the passage and from each other that flame travels to every part of the transverse area of the passage within the combustion zone. The elements may be heated electrically, by the combustion and/or by the heat of compression and should be constructed of heat resisting materials. Fig. 15 shows such an element consisting of a metal tube 75 which is formed into a cone by pressing the fins 76 from it. The large open end of the cone faces the airstream in a passage of the prime mover and as its area is greater than that of the slits in the fins the kinetic energy of the entering air is converted partially into increased pressure at higher temperature. As the device is in the zone of high pressure in the passage pressure and temperature in 75 are additional so that its temperature will be sufficient for ignition when the total pressure is above a certain value. For quite a high pressure in 75 it can be very light because of its small diameter particularly when outside pressure is also considerable therefore it is a means of obtaining compression ignition without the structure of the prime mover being subjected to the full high pressure necessary for such ignition. In addition the fins 76 extend into the combustion zone and are heated therein so maintaining the whole device at ignition temperature. The device of Fig. 15 may be employed for starting when the above two methods of heating may be inoperative by winding a wire heater 84 having refractory insulation around the device 75 as shown in Fig. 15 and heated by passing an electric current through it. The strips 77 are provided for attachment to the walls of the passage so holding the device in proper position therein as shown in Fig. 3 where the lower strips 77 are fixed to 3 and the upper strips 77 would normally be fixed to the part of 1 shown removed to expose the device 75 in a passage between adjacent vanes.

Prime movers according to the invention may be used in marine propulsion by using the high velocity gases discharged to accelerate water. For this purpose the modification, shown in Fig. 16, of the arrangement of Fig. 14 may be used, the parts 73 and 74 being immersed in water outside of the hull 78 of a ship and attached thereto by a frame 80. The prime mover 70 is installed inside of the hull 78 above water level 82 and a duct 79 is provided to convey the high velocity gases to a nozzle 81. The kinetic energy of the gases is transferred to the water entering 73, which is accelerated thereby producing thrust. The succeeding tubes such as 74 increase the efficiency.

I claim:

1. A prime mover including a rotatable structure having therein a system of helical passages coaxially disposed around the axis of rotation of said structure with inlets at one end and outlets at the other end of the structure for continuous flow of gases through said passages, the walls of said passages being shaped so that said passages have along them progressive changes of cross-sectional area whereby each said passage comprises an accelerating zone, a heating zone and a final zone, means for heating said gases by fuel combustion throughout at least some of said heating zones, including an igniter and supply systems for fuel and air, said gases entering said inlets flowing through said accelerating zones and being therein mechanically accelerated by rotation of said structure and compressed by retardation of said flow due to said changes of cross-sectional area in the accelerating zones and to back pressure of the heated fluid in said heating zones, the fluid then flowing into said heating zones throughout which the flowing gases are heated while expanding by the heat of said fuel combustion, the flowing gases then entering said final zones throughout which they are progressively expanded, the flowing gases then discharging through said outlets, the unresisted expansion in said heating and final zones accelerating the flowing gases along said helical passages, thereby exerting by reaction on said structure a torque which maintains its rotation and an axial thrust which, multiplied by the velocity of said structure relative to said flowing gases, is the power output of the prime mover in rectilinear form.

2. A prime mover including a structure consisting of a plurality of elements each of which rotates independently about a common axis, each of said elements having in it a system of helical ducts which are coaxially disposed about said axis, said ducts in the several elements adjoining end to end to build up passages with inlets at one end and outlets at the other end of each said passage through which a gaseous fluid can flow continuously from end to end of said structure, the walls of said ducts in each said element being shaped so that said ducts have along them progressive changes of cross-sectional area, whereby each said duct in each said element comprises an accelerating zone and a final zone, and each duct in at least one said element also includes a heating zone, means for heating said gases by fuel combustion throughout at least some of said heating zones, including an igniter and supply systems for fuel and air, said gases entering said inlets flowing through said accelerating zones and being therein mechanically accelerated by rotation of said structure and compressed by retardation of said flow due to changes of cross-sectional area in the accelerating zone and to back pressure of the heated fluid in said heating zone, the fluid then flowing into said heating zones throughout which the flowing gases are heated while expanding by the heat of said fuel combustion, the flowing gases then entering said final zones throughout which they are progressively expanded, the flowing gases then discharging through said outlets, the unresisted expansion in said heating and final zones accelerating the flowing gases along said passages built up of said helical ducts, thereby exerting by reaction on each said element a torque which maintains its rotation and an axial thrust on said structure which, multiplied by the velocity of said structure relative to said flowing gases, is the power output of the prime mover in rectilinear form.

3. A prime mover including a rotatable structure having therein a system of helical passages coaxially disposed around the axis of rotation of said structure, with inlets at one end and outlets at the other end of the structure for continuous flow of gases such as air and products of combustion through said passages, the walls of said passages being shaped so that said passages have along them progressive changes of cross-sectional area whereby each said passage comprises an accelerating zone, a heating zone and a final zone, means for heating said gases by fuel combustion throughout at least some of said heating zones, including an igniter and a supply system for injecting fuel into at least some of said heating zones for combustion in air flowing therein, air entering said inlets flowing through said accelerating zones and being therein mechanically accelerated by rotation of said structure and compressed by retardation of said flow due to said changes of cross-sectional area in the accelerating zones and to back pressure of the heated fluid in said heating zones, the fluid then flowing into said heating zones throughout which the flowing gases are heated while expanding by the heat of said fuel combustion the flowing gases then entering said final zones throughout which they are progressively expanded, the flowing gases then discharging through said outlets, the unresisted expansion in said heating and final zones accelerating the flowing gases along said helical passages, thereby exerting by reaction on said structure a torque which maintains its rotation and an axial thrust which, multiplied by the velocity of said structure relative to said flowing gases, is the power output of the prime mover in rectilinear form.

4. A prime mover including a rotatable structure having therein a system of helical passages coaxially disposed around the axis of rotation of said structure, with inlets at one end and outlets at the other end of the structure for continuous flow of gases such as air and products of combustion through said passages, the walls of said passages being shaped so that said passages have along them progressive changes of cross-sectional area, whereby each said passage comprises an accelerating zone, a heating zone and a final zone, means for supplying fuel to fuel ducts in said structure, each of said ducts having its discharge end opening into one of said heating zones and its intake end at less radius from said axis than its discharge end, centrifugal force on fuel in the said ducts causing injection of fuel into at least some of said heating zones for combustion of air flowing therein, an igniter in each heating zone receiving fuel, air entering said inlets flowing through said accelerating zones and being therein mechanically accelerated by rotation of said structure and compressed by retardation of said flow due to said changes of cross-sectional area in the accelerating zones and to back pressure of the heated fluid in said heating zones, the fluid then flowing into said heating zones throughout which the said flowing gases are heated while expanding by the heat of said fuel combustion, the flowing gases then entering said final zones throughout which they are progressively expanded, the flowing gases then discharging through said outlets, the unresisted expansion in said heating and final zones accelerating the flowing gases along said helical passages, thereby exerting by reaction on said structure a torque which maintains its rotation and an axial thrust which, multiplied by the velocity of said structure relative to said flowing gases, is the power output of the prime mover in rectilinear form.

5. A prime mover capable of propelling itself through gases in which it is immersed, said prime mover comprising a rotatable body having an annular passage running throughout the length of said body, the walls of said passage being shaped so that said passage has along it progressive changes of cross-sectional area whereby it comprises an accelerating zone, a heating zone and a final zone, vanes having a helical pitch disposed in said accelerating zone and fixed to said body, vanes having a helical pitch disposed in said final zone and fixed to said body, means for heating said gases by fuel combustion throughout said heating zone, including an igniter and supply systems for fuel and oxygen, said gases entering said inlets flowing through said accelerating zone and being therein mechanically accelerated by rotation of said structure and compressed by retardation of said flow due to said changes in cross-sectional area in the accelerating zone and to back pressure of the heated gases in said heating zone, the gases then flowing into said heating zone throughout which the said flowing gases are heated while expanding by the heat of said fuel combustion the flowing gases then entering said final zone throughout which they are progressively expanded, the flowing gases then discharging through said outlets, the unresisted expansion in said heating and final zones accelerating the flowing gases along said passage, and therefore between the said vanes in the final zone, thereby exerting by reaction on said structure a torque which maintains its rotation and an axial thrust which serves to overcome resistance to translation of said body, the product of said thrust and the velocity of translation of said body being the useful power output of the said prime mover in rectilinear form.

6. A prime mover for direct jet propulsion of a vehicle in air, comprising a spindle, an anchorage fixed to the vehicle for said spindle, a structure freely rotating on said spindle and having in it a system of helical passages coaxially disposed around the axis of rotation of said structure with inlets at one end and outlets at the other end of the structure for continuous flow of gases through said passages, the walls of said passages being shaped so that said passages have along them progressive changes of cross-sectional area whereby each said passage comprises an accelerating zone, a heating zone and a final zone, means for heating gases by fuel combustion throughout at least some of said heating zones, including an igniter and a supply system for injecting fuel into at least some of said heating zones for combustion in air flowing therein, air entering said inlets and flowing through said accelerating zones being therein mechanically accelerated by rotation of said structure and compressed by retardation of said flow due to said changes of cross-sectional area in the accelerating zones and to back pressure of the heated gases in said heating zones, the air then flowing into said heating zones throughout which the flowing gases consisting of air and the products of combustion, are heated while expanding by the heat of said fuel combustion the flowing gases then entering said final zones throughout which they are progressively expanded, the flowing gases then discharging through said outlets, the unresisted expansion in said heating and final zones accelerating the flowing gases along said helical passages thereby exerting by reaction on said structure a torque which maintains its rotation and an axial thrust which is applied to the vehicle through the aforesaid anchorage for the purpose of propelling that vehicle.

7. A prime mover for direct jet propulsion of a vehicle in air, comprising a spindle, an anchorage having bearings for the said spindle, said anchorage being rotatable in a bearing fixed to said vehicle about an axis at an angle to the axis of said spindle, thereby permitting adjustment of the direction of the spindle relative to the vehicle, a structure consisting of a plurality of elements each of which rotates, and each of the said elements which rotates relative to the spindle has bearings on said spindle for relative rotation of all elements to one another, each of the said elements having therein a system of helical ducts which are coaxially disposed about said spindle, said ducts in the several elements adjoining end to end to build up passages through which a gaseous fluid can flow continuously from end to end of said structure, the walls of said ducts in each of said elements being shaped so that said ducts have along them progressive changes of cross-sectional area whereby each said duct in each said element comprises an accelerating zone and a final zone, and each duct in at least one said element also includes a heating zone, means for heating gases by fuel combustion throughout at least some of said heating zones, including an igniter and a supply system for injecting fuel into at least some of said heating zones for combustion in air flowing therein, air entering said inlets and flowing through said accelerating zones and being therein mechanically accelerated by rotation of said structure and compressed by retardation of said flow due to said changes of cross-sectional area in the accelerating zones and to back presure of the heated gases in said heating zones, the air then flowing into said heating zones throughout which the flowing gases, consisting of the air and products of combustion, are heated while expanding by the heat of said fuel combustion, the flowing gases then entering said final zones throughout which they are progressively expanded, the flowing gases then discharging through said outlets, the unresisted expansion in said heating and final zones accelerating the flowing gases along said passages built up of said helical ducts, thereby exerting by reaction on each said element a torque which maintains its rotation, and an axial thrust on said structure which is applied to the vehicle through the aforesaid anchorage for the purpose of propelling that vehicle.

8. A prime mover including a rotatable structure having therein a system of helical passages coaxially disposed around the axis of rotation of said structure with inlets at one end and outlets at the other end of the structure for continuous flow of air through said passages, the walls of said passages being shaped so that said passages have along them progressive changes of cross-sectional area whereby each said passage comprises an accelerating zone, a heating zone and a final zone, means for heating gases by fuel combustion throughout at least some of said heating zones, including an igniter and a supply system for injecting fuel into at least some of said heating zones for combustion in air flowing therein, air entering said inlets and flowing through said accelerating zones being therein mechanically accelerated by rotation of said structure and compressed by retardation of said flow due to said changes of cross-sectional area in the accelerating zones and to back pressure of the heated gases in said heating zones, the air then flowing into said heating zones throughout which the flowing gases consisting of air and the products of combustion, are heated while expanding by the heat of said fuel combustion, the flowing gases then entering said final zones throughout which they are progressively expanded, the flowing gases then discharging through said outlets, the unresisted expansion in said heating and final zones accelerating the flowing gases along said helical passages, thereby exerting by reaction on said structure a torque which maintains its rotation and an axial thrust which multiplied by the velocity of said structure relative to the expanded gases is the rectilinear power output, and metering means responsive to variation in the pressure of air in said passages at the points of fuel injection for regulating the rate of fuel supply.

9. A prime mover as defined in claim 3, and in which the igniter consists of a vessel having an orifice facing the flow of gases in a heating zone as said gases enter said vessel and are retarded therein, thereby converting kinetic energy of the flowing gases into heat of those gases, and thereby heating the said vessel by conduction.

10. A prime mover as defined in claim 1, and in which there is provided a convergent tube so arranged that the expanded gases axially discharged from said passages is conducted into the throat of said tube and kinetc energy of the said gases is transferred to fluid in which said tube is immersed, and which is accelerated thereby and discharged through said tube, thereby exerting a thrust by reaction on said tube, the product of said thrust and the velocity of continuous movement of said tube relative to the fluid in which it immersed thereby providing power output in rectilinear form, a support for said structure and said tube, and bearing means between said structure and said support.

11. A prime mover comprising a spindle, an anchorage for said spindle, a structure freely rotatable on said spindle and having in it a system of helical passages coaxially disposed around the axis of said spindle with inlets at one end and outlets at the other end of the structure for continuous flow of gases through said passages, the walls of said passages being shaped so that said passages have along them progressive changes of cross-sectional area whereby each said passage comprises an accelerating zone, a heating zone and a final zone, means for heating said gases by fuel combustion throughout at least some of said heating zones, including an igniter and supply systems for fuel and air, said gases entering said inlets flowing through said accelerating zones and being therein mechanically accelerated by rotation of said structure and compressed by retardation of said flow due to said changes of cross-sectional area in the accelerating zones and to back pressure of the heated gases in said heating zones, the gases then flowing into said heating zones throughout which the flowing gases are heated while expanding by the heat of said fuel combustion, the flowing gases then entering said final zones throughout which they are progressively expanded, the flowing gases then discharging through said outlets, the unresisted expansion in said heating and final zones accelerating the flowing gases along said helical passages, thereby exerting by reaction on said structure a torque which maintains its rotation, a duct with its entrance portion coaxial with the said structure, and a convergent tube coaxial with the other end of said duct, the said gases discharged from said structure flowing through said duct and being discharged by that duct into the throat of said convergent tube which is immersed in a fluid so that the said discharged gases transfer part of their kinetic energy to fluid in said convergent tube, thereby causing flow of that fluid through that tube, and discharge by that tube of a greater mass at a lower velocity of fluid than the mass and velocity of gases discharged by said structure, the said duct and said convergent tube being fixed to said anchorage, the acceleration of said greater mass in said convergent tube exerting by reaction a thrust on that tube, and the product of that thrust and the velocity of said convergent tube relative to the fluid in which it is immersed, providing a power output in rectilinear form.

12. A prime mover comprising a spindle, an anchorage for said spindle, a structure consisting of a plurality of elements each of which rotates independently, each of said elements which rotates relative to the spindle having bearings on said spindle for relative rotation to one another, each of said elements having in it a system of helical ducts which are coaxially disposed about said spindle, said ducts in the several elements adjoining end to end to build up passages through which gases can flow continuously from end to end of said structure, the walls of said ducts in each said element being shaped so that said ducts have along them progressive changes in cross-sectional area, whereby each said duct in each said element comprises an accelerating zone and a final zone, and each duct in at least one said element also includes a heating zone, means for heating said gases by fuel combustion throughout at least some of said heating zones, including an igniter and supply systems for fuel and air, said gases entering said inlets flowing through said accelerating zones and being therein accelerated by rotation of said structure and compressed by retardation of said flow due to said changes of cross-sectional area in the accelerating zones and to back pressure of the heated gases in said heating zones, the gases then flowing into said heating zones throughout which the flowing gases are heated while expanding by the heat of said fuel combustion, the flowing gases then entering said final zones throughout which they are progressively expanded, the flowing gases then discharging through said outlets, the unresisted expansion in said heating and final zones accelerating the flowing gases along said passages built up of said helical ducts, thereby exerting by reaction on each said element a torque which maintains its rotation, the discharged gases retaining the axial component of increased kinetic energy thereof due to said expansion, a plurality of tubes of successively increased cross-sectional areas, the said discharged gases as an accelerating fluid being discharged into the tube having the least cross-sectional area by the aforesaid structure, and each of said tubes in an intermediate position discharging into the following tube, at least one of said tubes being convergent and immersed in a fluid, the discharged fluid from the preceding tube transferring part of its kinetic energy to fluid in the said convergent tube so that discharged fluid therefrom has greater mass and lower velocity than the fluid discharged by the preceding tube, and therefore the final tube of said plurality of tubes discharges an increased mass of fluid at lower velocity, the acceleration of said increased mass of fluid exerting by reaction a thrust on said tubes, and the product of said thrust and the velocity of continuous movement of said final tube relative to said fluid providing power output in rectilinear form, and means fixed to the aforesaid anchorage for preventing movement of said tubes relative to each other and to the aforesaid structure in the direction of fluid flow.

13. A prime mover adapted to propel itself through the atmosphere, and including a rotatable structure having therein a system of helical passages disposed around the axis of rotation of said structure with inlets at one end and outlets at the other end of that structure, through which air can flow continuously, said structure being also shaped by progressive changes of cross-sectional area of said passages along said axis so that each passage comprises an accelerating zone, a heating zone and a final zone, said structure comprising a plurality of chambers disposed within the helices constituted by said system of passages, at least one of said chambers being a container for a disposable load, and at least one other said chamber being a reservoir for fuel, fuel feed ducts leading from said fuel reservoir and opening into said heating zones of at least some of said passages, ignition means in said heating zones which receive fuel, centrifugal force on fuel in said ducts injecting fuel into the heating zones of said passages for combustion in air flowing therein, air entering said passages through said inlets being mechanically accelerated by rotation of said structure and compressed by retardation as it flows through said accelerating zones, due to said changes of cross-sectional area therein and to back pressure caused by heating said air as it flows in said heating zones throughout which the flowing air and products of combustion are heated by said combustion while expanding, the flowing air and products of combustion then flowing through said final zones in which it progressively expands and then flows through said outlets, the unresisted expansion in said heating and final zones accelerating the air and products of combustion along said helical passages, thereby exerting by reaction on said structure a torque which maintains its rotation and an axial thrust which propels said prime mover through the atmosphere.

14. A prime mover capable of propelling itself through air, said prime mover comprising a tubular shell, a hollow elongated core coaxially disposed within said shell, said core including a fuel reservoir, means connecting said core and said shell and forming a series of passages therebetween which are helically disposed about the common axis of said core and said shell, said core being shaped to have variations of its diameter along its axis, thereby giving each said passage variations of cross-sectional area along the axis, so that each passage comprises an accelerating zone, a combustion zone and a final zone, whereby air entering and flowing through said accelerating zones is accelerated therein by rotation of said prime mover and compressed by retardation of said flow of air, due to back pressure caused by heating and said variations of cross-sectional area, when the prime mover is subjected to translation along and rotation about said axis, and means for transferring fuel from said reservoir to at least some of said passages for combustion in said combustion zones thereof into which the compressed air flows and, heated by the said combustion, partially expands in the said divergent portions, the discharge into which the compressed air from said accelerating zones flows and is heated while expanding by the said combustion and then flows into said final zones of said passages in which the air and products of combustion have full final expansion and are discharged from the passages, the unrestricted expansion in said combustion and final zones accelerating the air and products of combustion along said helical passages, thereby exerting an axial thrust and a torque by reaction on said prime mover appropriate for maintaining said translation and rotation.

15. A prime mover for operation immersed in an atmosphere of gaseous working fluid and for producing power by maintaining continuous substantially rectilinear movement of itself relative to such atmosphere, said prime mover including a tubular shell of substantially cylindrical form but of progressively reduced diameter at its leading end, a core coaxially disposed within said shell, means connecting said core and said shell and forming therewith a series of passages therebetween which are helically disposed about the common axis of said core and said shell which are rotatable about said axis, said core being shaped to have variations of its diameter along said axis, thereby giving each said passage variations of cross-sectional area along the axis so that each passage comprises an accelerating zone, a heating zone and a final zone, said accelerating zones receiving, accelerating and compressing working fluid flowing therethrough on rotation and rectilinear movement along said axis of the prime mover relative to said atmosphere, and means associated with said heating zones of at least some of said passages for heating the compressed working fluid flowing thereinto, the heated fluid partially expanding in the said divergent portions, flowing thereinto from said accelerating zones while that fluid expands the fluid then flowing into said final zones in which it fully expands before discharge from the passages, the unrestricted expansion in the said heating and final zones accelerating the fluid along the passages so that it has additional kinetic energy in such directions that the peripheral component of the kinetic energy is used to maintain said rotation while the axial component thereof serves to maintain said rectilinear movement.

16. A prime mover as claimed in claim 8, wherein said metering means include an evacuated chamber having a flexible wall, a rack fixed to said wall and displaceable along said axis, a pinion engaging with said rack, and a screw needle valve operatively connected with said pinion.

17. A prime mover as claimed in claim 8, wherein said metering means include a stop valve in a duct arranged to supply fuel to a selected group of said passages.

18. A prime mover as claimed in claim 8, wherein said metering means include a plurality of stop valves in separate ducts arranged to supply fuel respectively to selected groups of said passages, and gearing connecting said means responsive to variation in the pressure to said valves for opening and closing them successively and thereby progressively increasing the number of active passages with decrease in said pressure.

19. A prime mover intended for propulsion of a body through air by the reaction of a jet of gases having a relatively high velocity, said prime mover including a self-energizing rotary nozzle for gases, a convergent tube so positioned coaxially with and adjacent to said nozzle that the gases discharged by said nozzle enter the throat of said tube and thereby accelerate flow of surrounding air into said tube which discharges an increased mass of gases at a higher velocity compared with the velocity of air external to the said tube and increasing the propulsive efficiency of the whole, relative to that of the nozzle alone, a support for said tube and said nozzle, and bearing means between said nozzle and said support, said nozzle including a passage helically disposed about its axis of rotation, having its inlet at one end and its outlet at the other end of said nozzle, the wall of said passage being shaped to provide progressive changes of cross-sectional area of said passage along said axis so that it comprises an accelerating zone, a heating zone and a final zone, means for injecting fuel into said heating zone for combustion in air flowing therein throughout the heating zone, air entering said passage through said intake being mechanically accelerated by rotation of said nozzle and compressed by retardation of the air due to said changes of cross-sectional area and back pressure caused by heating as the air flows through said accelerating zone into said heating zone, throughout which the flowing air and products of combustion are heated by said combustion while expanding, the flowing air and products of combustion then flowing through said final zone in which they progressively expand and then flow through said discharge as said jet of gases, the unrestricted expansion in said heating and final zones accelerating the air and products of combustion along said helical passage, thereby exerting by reaction a torque on said nozzle which maintains its rotation, the said jet retaining the axial component of increased velocity.

20. A prime mover comprising a support, a spindle on said support, a structure mounted for rotation on said spindle and including a passage leading from end to end of the structure through which a gaseous fluid can flow continuously, the entry portion of said passage being helically disposed, and the wall of the passage being shaped so that said entry portion has progressively changing cross-sectional area so that said rotation causes mechanical acceleration and compression of fluid entering the passage as caused by said changes of cross-sectional area and back pressure due to heating which retards that fluid, means for heating fluid while so compressed and while it expands throughout a heating zone in said passage, the outlet portion of said passage being helically disposed and the wall of the passage being shaped so that said outlet portion has progressively changing cross-sectional area so that final expansion of the fluid in the passage occurs with conversion of heat into additional kinetic energy of such fluid whereby said rotation is maintained while a rectilinear power output results from the continuous axial relative movement between said structure and the air stream through said passage, and an electro-magnetic machine including co-operating magnetic circuit elements respectively fast with said spindle and said structure and an electrically conducting winding on at least one of said circuit elements.

GEORGE WILLIAM WALTON.